US008064483B2

(12) United States Patent  (10) Patent No.: US 8,064,483 B2
Ooshima                      (45) Date of Patent:   Nov. 22, 2011

(54) PROTOCOL PROCESSING APPARATUS AND PROCESSING METHOD THEREOF

(75) Inventor: Hiroyoshi Ooshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 12/492,631

(22) Filed: Jun. 26, 2009

(65) Prior Publication Data

US 2010/0008380 A1    Jan. 14, 2010

(30) Foreign Application Priority Data

Jul. 14, 2008   (JP) .................................. 2008-183023

(51) Int. Cl.
    *H04J 3/24*           (2006.01)
(52) U.S. Cl. ........ 370/474; 370/476; 370/473; 370/394; 370/395.1
(58) Field of Classification Search .................. None
    See application file for complete search history.

(56) References Cited

U.S. PATENT DOCUMENTS

| 6,185,208 | B1* | 2/2001 | Liao ............................... 370/392 |
| 7,433,314 | B2* | 10/2008 | Sharma et al. ................. 370/236 |
| 7,599,363 | B2* | 10/2009 | Jang et al. ..................... 370/389 |
| 2002/0118671 | A1* | 8/2002 | Staples et al. ................. 370/352 |
| 2003/0039249 | A1* | 2/2003 | Basso et al. .................... 370/394 |
| 2003/0210710 | A1* | 11/2003 | Odman ........................ 370/471 |

FOREIGN PATENT DOCUMENTS

JP   2007-274056   10/2007

OTHER PUBLICATIONS

U.S. Appl. No. 12/501,407, filed Jul. 11, 2009.
RFC 791, "Internet Protocol, DARPA Internet Program Protocol Specification", Sep. 1981.

* cited by examiner

*Primary Examiner* — Huy Vu
*Assistant Examiner* — Kibrom T Hailu
(74) *Attorney, Agent, or Firm* — Fitzpatrick, Cella, Harper & Scinto

(57) ABSTRACT

A protocol processing apparatus determines a unit size of a bitmap table to be used in reassembly based on the size of a received fragmented IP datagram. A bitmap table is generated according to the determined unit size, and the received fragmented IP datagram is reassembled using the generated bitmap table.

4 Claims, 10 Drawing Sheets

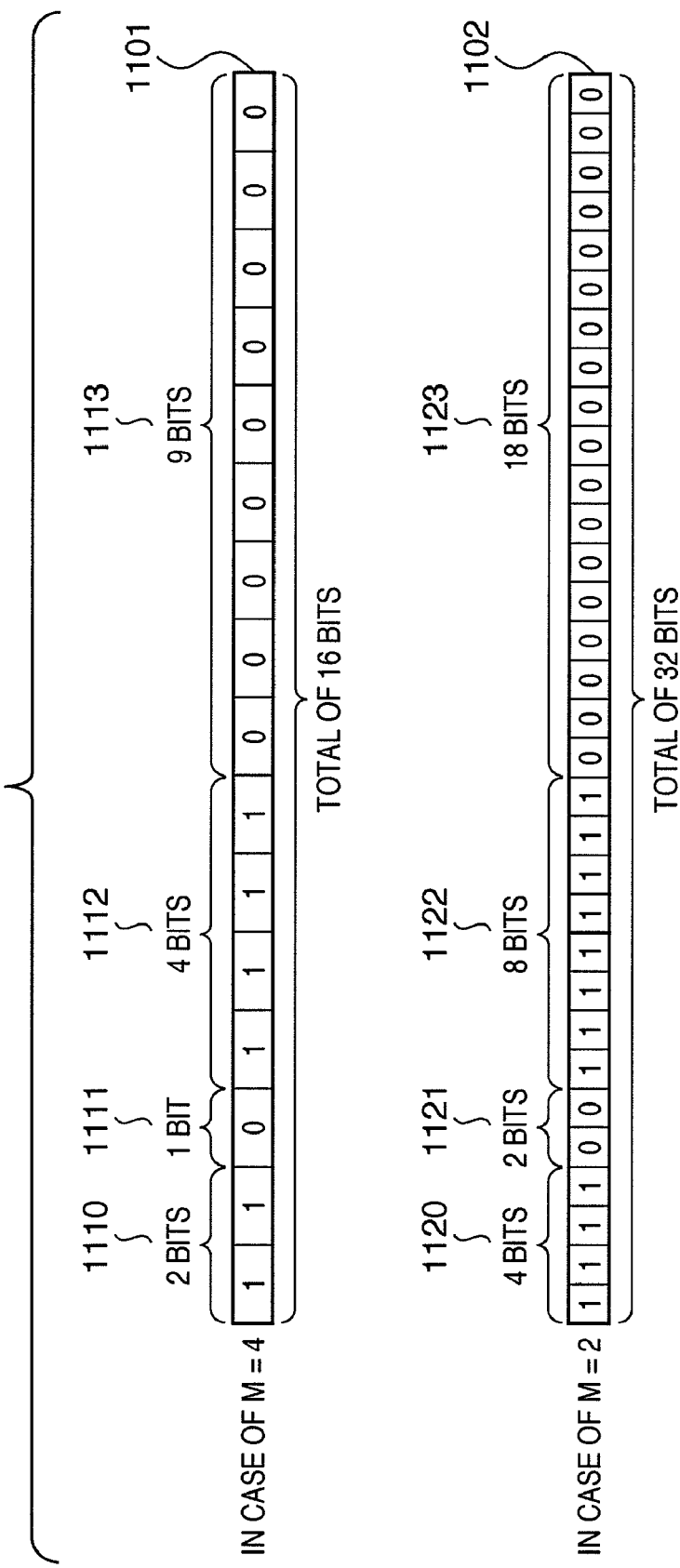

PROTOCOL PROCESSING APPARATUS AND PROCESSING METHOD THEREOF

BACKGROUND OF THE INVENTION

1. Field of the Invention

The present invention relates to a protocol processing apparatus that receives and reassembles a fragmented IP datagram, and a processing method thereof.

2. Description of the Related Art

Conventionally, reassembly of a fragmented IP datagram is performed as a part of network protocol processing. Methods of fragmentation and reassembly of IP datagrams are described in RFC 791 Internet Protocol. RFC 791 introduces a reassembly method using a fragment block bit table (hereinafter referred to as a bit table) as a reassembly example. Reassembly using a bit table requires a bit table of 8192 bits.

This is due to the fact that the maximum payload size of an IP datagram prior to fragmentation is 64 Kbytes and that an IP datagram can be fragmented in 8 byte units. That is, when transmitting an IP datagram with a payload of 64 Kbytes split into IP datagrams with a payload of 8 bytes that is the minimum payload size, the original IP datagram is split into 8192 (=64 Kbytes÷8 bytes) IP datagrams.

Therefore, a bit table of 8192 bits is required to manage the reception status of the fragmented IP datagram.

Consequently, it is conceivable that a bit table of 64 Kbytes that is the maximum payload size of an IP datagram need not be prepared if the payload size of the IP datagram prior to fragmentation is known in advance. However, only the following two fields are attached as fragment-related information to the header of IP datagrams as defined by RFC 791.

(1) FO (Fragment Offset): offset of the payload of an IP datagram prior to fragmentation.

(2) MF (More Fragments flag): flag indicating whether subsequent fragmented packets exist or not.

Therefore, while the MF of an IP header of a fragmented end IP datagram has not been set, the MFs of IP headers of all other fragmented IP datagrams have been set. In other words, unless the fragmented end IP datagram is received, the payload size of the IP datagram prior to fragmentation cannot be determined. Therefore, a bit table of 64 Kbytes that is the maximum payload for an IP datagram must be prepared.

On the other hand, it is conceivable that a bit table of 8 byte-units need not be prepared if the split payload size during fragmentation is known in advance. However, a communication network interconnecting various routers exists between a transmitting device and a receiving device of an IP datagram, and it is impossible to confirm or control which of the routes in the communication network is to be used to transmit the IP datagram. That is, there is no way to know at what size an IP datagram to possibly be fragmented by any of the routers will be fragmented upon arrival at the receiving device. Therefore, the bit table must be prepared in 8 byte-units that is the minimum payload size to be split by fragmentation.

Moreover, Japanese Patent Laid-Open No. 2007-274056 describes numbering in an order of fragmented packets and managing a reassembly state using a bitmap that associates the numbers with bit positions.

A size of 8192 bits must be secured for the conventional bit table described above even when receiving IP datagrams whose payload size is less than 64 Kbytes. In addition, a bit table in 8 byte-units must be secured even when the payload sizes of fragmented IP datagrams are standardized to, for example, 1 Kbyte.

This restriction means that when receiving an IP datagram whose payload size is smaller than 64 Kbytes or an IP datagram whose payload size during fragmentation is fixed, an area of the bit table is to be needlessly secured. In particular, with platforms with limited memory size such as an embedded system, there is concern that the overall performance of the system may decline or the cost of building the system may rise. Especially, since reassembly is one of the processes in protocol processing whose processing load is the heaviest, the area of the bit table is sometimes implemented by an SRAM or the like that is expensive but nevertheless fast. In this case, it is assumed that the problem of increased cost will become even more significant.

SUMMARY OF THE INVENTION

The present invention provides an apparatus and method that can reduce the size of a bitmap table necessary for reassembly.

According to one aspect of the present invention, there is provided a protocol processing apparatus that reassembles a fragmented IP datagram, comprising: a determination unit that determines a unit size of a bitmap table to be used in the reassembly based on the size of the received fragmented IP datagram; a generation unit that generates a bitmap table according to the unit size determined by the determination unit; and a reassembly unit that reassembles the IP datagram using the bitmap table generated by the generation unit.

According to another aspect of the present invention, there is provided a processing method of a protocol processing apparatus that reassembles a fragmented IP datagram, the method comprising: determining a unit size of a bitmap table to be used in the reassembly based on the size of the received fragmented IP datagram; generating a bitmap table according to the determined unit size; and reassembling the IP datagram using the generated bitmap table.

Further features of the present invention will become apparent from the following description of exemplary embodiments with reference to the attached drawings.

BRIEF DESCRIPTION OF THE DRAWINGS

FIG. 11 is a diagram showing an example of a case where a unit size is changed to a divisor multiple of the unit size.

DESCRIPTION OF THE EMBODIMENTS

Preferred embodiments of the present invention will now be described in detail with reference to the drawings.

Figure 1:
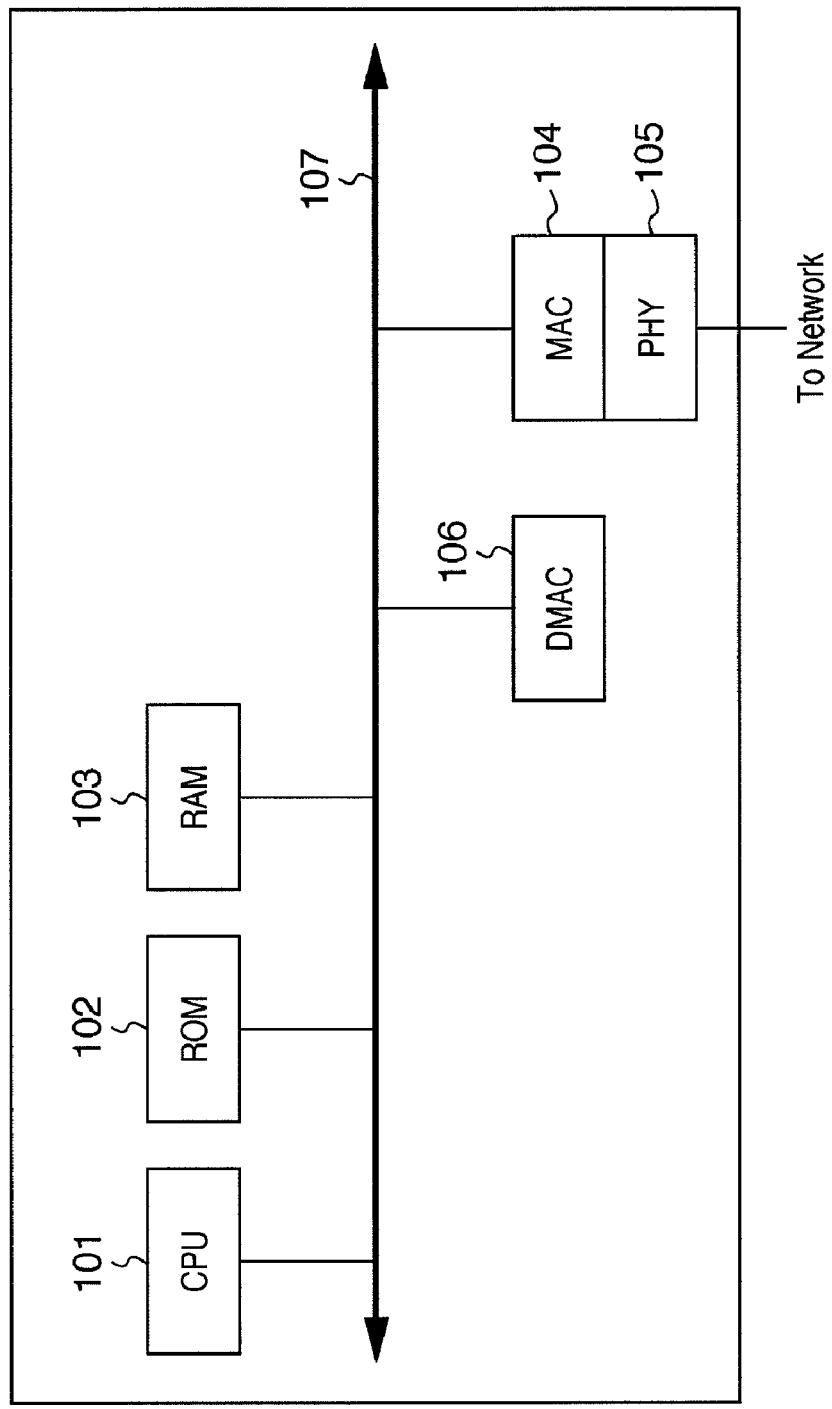
FIG. 1 is a block diagram showing an example of a configuration of a protocol processing apparatus according to an embodiment of the present invention.

FIG. 1 is a block diagram showing an example of a configuration of a protocol processing apparatus according to an embodiment of the present invention. A CPU 101 executes TCP/IP network protocol processing according to a control program (software) stored in a ROM to be described later. A ROM 102 stores software to be executed by the CPU 101 and control data. A RAM 103 is used as a work area when protocol processing is being executed by the CPU 101.

MAC (media access control) 104 is a communication protocol forming a part of a data link layer that corresponds to a second layer in an OSI reference model. A PHY (physical layer) 105 is hardware corresponding to a first layer in an OSI reference model and which performs protocol processing and handles electrical signals. A DMAC (Direct Memory Access Controller) 106 regulates transfer of data to be transmitted and received in TCP/IP network communication between the RAM 103 and the MAC 104. A bus 107 interconnects the CPU 101, the ROM 102, the RAM 103, the MAC 104, and the DMAC 106 described above.

Moreover, while the RAM 103 is generally realized with an inexpensive DRAM (off-chip), the RAM 103 may alternatively be realized by a faster on-chip SRAM. However, on-chip SRAMs are expensive. Therefore, it may be difficult to mount an on-chip SRAM sufficiently sized so as to be capable of storing all data that the present embodiment assumes to be stored by the RAM 103. In such a case, the RAM 103 is suitably realized by combining an inexpensive but slow DRAM with an expensive but fast SRAM.

In other words, this is a form in which frequently-accessed data and data significantly influencing protocol processing capabilities are stored in the fast on-chip SRAM while other data is stored in the DRAM. In the present embodiment, the RAM 103 may be realized by a DRAM and an on-chip SRAM or any other storage medium, in which case all of such configurations shall collectively be referred to as the RAM 103.

In addition to its use as a work area of the CPU 101, the RAM 103 is used as a storage area of data required when executing TCP/IP network protocol processing. Such data includes: data to be transmitted/received during TCP/IP network communication; fragment block bit tables; tables of fragment block bit table management information, and the like.

Moreover, a fragment block bit table shall be referred to as a bit table and a table of fragment block bit table management information as a management table. In addition, management information of each bit table stored in the management table shall be referred to as a management entry. The bit table is also known as a bitmap table.

Figure 2:
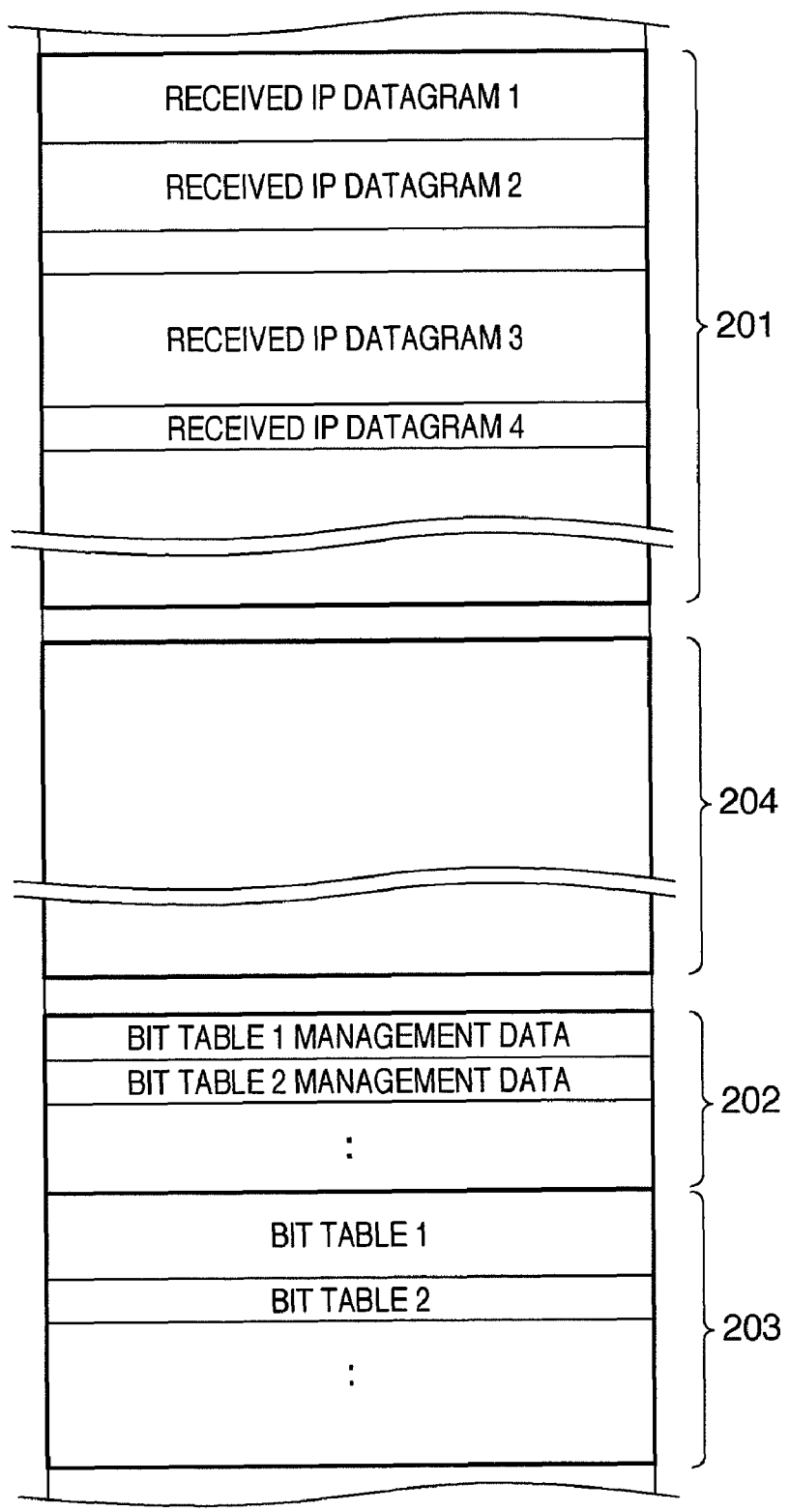
FIG. 2 is a diagram schematically showing data inside a RAM 103.

FIG. 2 is a diagram schematically showing data inside the RAM 103. In FIG. 2, only data necessary for describing the present invention is shown. While there are other data necessary for realizing protocol processing, such data is not shown. Data not shown includes data such as work data processed by the CPU 101 and transmitted IP datagram bodies.

In FIG. 2, received IP datagrams are temporarily stored in a received data area 201. A management table 202 stores management entries that are management information of the respective bit tables. A management entry is primarily generated upon start of reassembly together with an associated bit table, and retains information of an IP datagram that is a reassembly object until reassembly is terminated.

A bit table area 203 stores bit table bodies. All bit tables are associated one-to-one with predetermined management entries. A reassemble buffer 204 stores payload data of IP datagrams currently being reassembled.

While the reassemble buffer 204 stores payload data of IP datagrams currently being reassembled, many options are available as to the method of storage. Payload data being reassembled does not necessarily arrive in sequence starting at the top with respect to payload data prior to fragmentation. In addition, payload data that overlaps with already-arrived payload data may conceivably arrive afterwards.

Therefore, in a general storage method, a data area of 64 Kbytes that is the maximum payload data size prior to fragmentation is secured upon the start of reassembly, and payload data of a received IP datagram is then suitably stored in a corresponding portion.

Other storage methods include using a linked list. A linked list is a data structure whereby data stored in fragments may be virtually interfaced as one continuous item of data by separate maintenance of list information for each respective fragment, indicating the storage location of a subsequent fragment. This method is advantageous in that arrived IP datagrams need only be stored in a free area irrespective of sequence and without having to secure a large data area of 64 Kbytes in advance. According to this method, for example, when the payload size prior to fragmentation is 1 Kbyte, there is no more need to secure a data area of 64 Kbytes and the memory area can be used effectively.

Generally, the former method is mainly employed when performing reassembly using hardware, and the latter method is mainly employed when performing reassembly using software.

Since the method of managing a reassembly buffer is not directly related to the present invention, any method may be employed as long as payload data prior to fragmentation can be regenerated, and a detailed description thereof shall be omitted.

Next, a relationship between management entries in the management table 202 and bit tables in the bit table area 203 will be described with reference to FIGS. 3 and 4.

Figure 3:
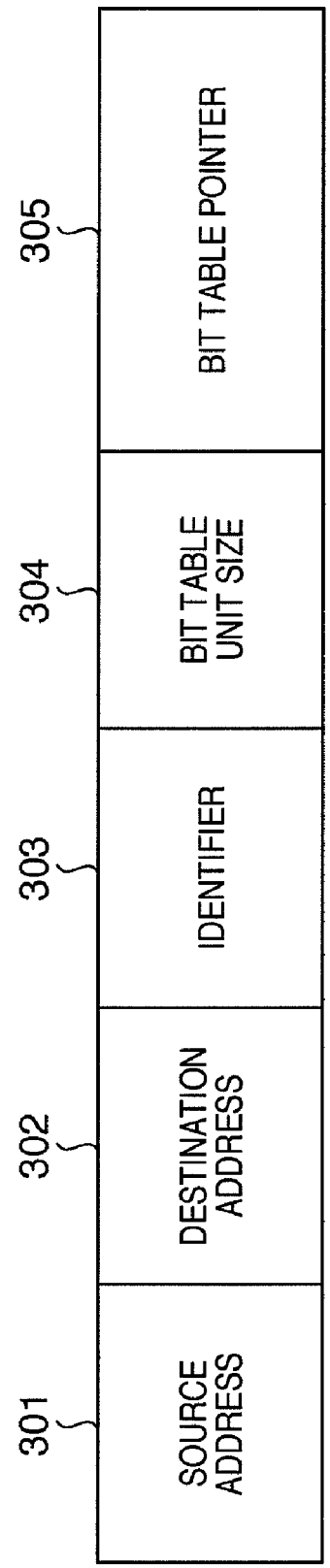
FIG. 3 is a diagram showing, in detail, management entries stored in a management table 202.

FIG. 3 is a diagram showing, in detail, management entries stored in the management table 202. In FIG. 3, a source address 301 is consistent with the value of a Source Address field stored in a received IP header. A destination address 302 is similarly consistent with the Destination Address of the IP header. An identifier 303 is similarly consistent with the Identification of the IP header.

The respective pieces of information of the source address 301, the destination address 302 and the identifier 303 are used for identifying a target reassembly IP datagram. This is because when an IP datagram is fragmented by a source device or a router, the three fields of the IP datagram prior to fragmentation are copied onto the three fields of the IP header of the fragmented IP datagram.

Therefore, the receiving device must perform reassembly on IP datagrams whose three fields described above match, while reassembly of IP datagrams whose three fields are do not match must be performed as separate processes.

In the present embodiment, it is assumed that reassembly of a plurality of IP datagrams is performed in parallel. In consideration thereof, a management entry retains information of the three fields in order to identify which IP datagram an associated bit table is used to reassemble.

A bit table unit size 304 is information indicating how many bytes a single byte of the associated bit table corresponds to. A bit table pointer 305 is information indicating a storage address in the bit table area 203 associated with this management entry.

Figure 4:
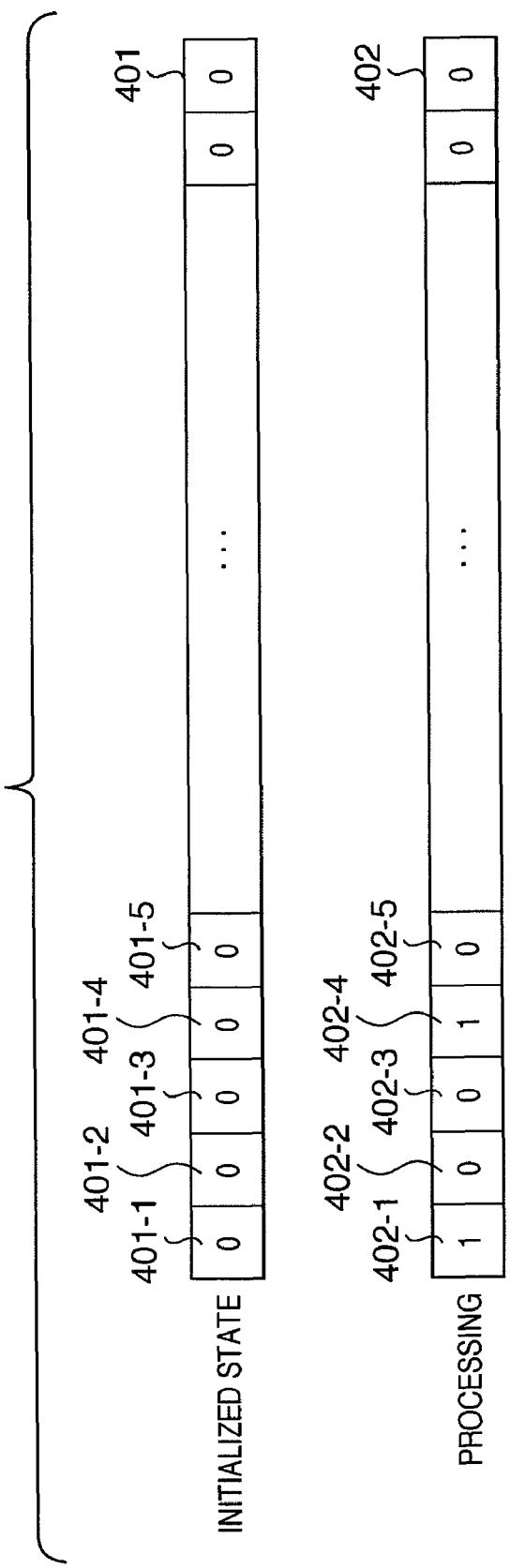
FIG. 4 is a diagram showing, in detail, bit tables stored in a bit table area 203.

FIG. 4 is a diagram showing, in detail, bit tables stored in the bit table area 203. In FIG. 4, reference numeral 401 denotes a bit table body upon initialization, while reference numeral 402 denotes a bit table body during predetermined reassembly. Bits 401-1 to 401-5 and 402-1 to 402-5 of the respective bit tables indicate whether payload data has been respectively received or not. A set value of "1" indicates that payload data has been received. Conversely, a set value of "0" indicates that payload data has not been received. In addition, upon initialization of a bit table, since all payload data is yet to be received, all bits are set to "0".

The relationship between the bit table unit size 304 and a bit table will now be described. It is hereby assumed that the bit table unit size 304 of the management entries is 1 Kbyte (=1024 bytes). Moreover, it is assumed that the bit table (the bit table of the storage address indicated by a bit table pointer 305) associated with the management entry is "Processing" 402 shown in FIG. 4. Reference characters 402-1 to 402-5 in "Processing" 402 respectively correspond to 1 Kbyte's worth of payload data.

In "Processing 402", the "1" set for 402-1 indicates that among the payload of an IP datagram prior to fragmentation, 1 Kbyte's worth of data from the top has already been received. In addition, the "1" also set for 402-4 indicates that among the payload of the IP datagram prior to fragmentation, 1 Kbyte's worth of data from a 3 Kbyte-offset from the top has already been received.

On the other hand, the "0" also set for 402-2 indicates that among the payload of the IP datagram prior to fragmentation, 1 Kbyte's worth of data from a 1 Kbyte-offset from the top has not been received. In a similar manner to 402-2, 402-3 and 402-5 indicate that 1 Kbyte's worth of data from corresponding offsets has not been received.

Next, contents of processes performed on management entries and bit tables will be described with reference to FIGS. 5 to 8. The following four processes are performed on management entries and bit tables. The processes are to be executed by the CPU 101.

<Reset reassembly process> Initializes a management entry and a bit table upon start of reassembly and when the bit table unit size is changed;

<Normal reassembly process> Updates bit table status based on an IP datagram payload upon receipt of the fragmented IP datagram;

<Reassembly termination process> Releases the management entry and the bit table upon reassembly termination; and <Bit table migration process> When the bit table unit size is changed, reflects reception status information of the old bit table onto the new bit table.

Figure 5:
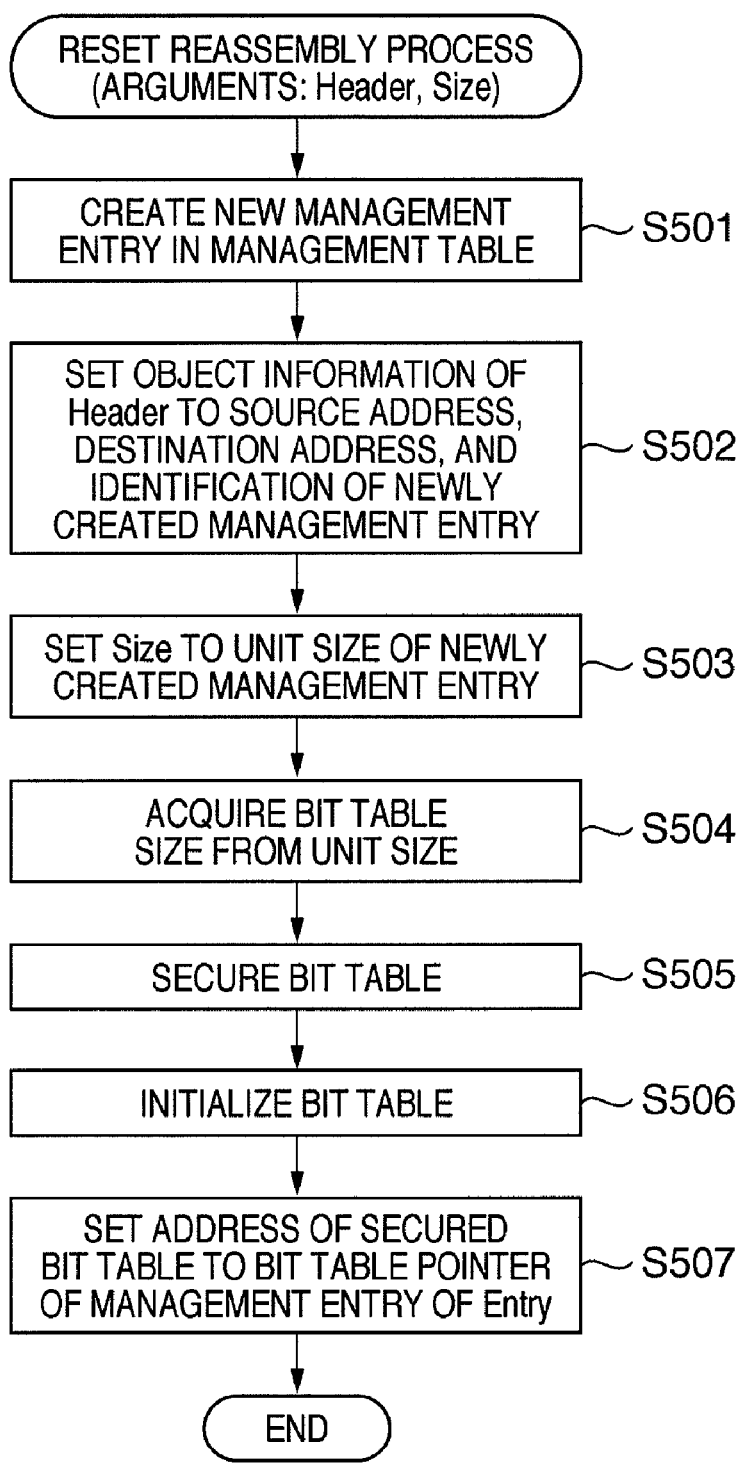
FIG. 5 is a flowchart showing a processing procedure of a reset reassembly process.

FIG. 5 is a flowchart showing a processing procedure of the reset reassembly process. While this process is performed upon start of reassembly and when the bit table unit size is changed, both cases are premised upon reception of a fragmented IP datagram. In addition, the bit table unit size 304 is also determined prior to executing this processing, whereby the IP header information and the bit table unit size of the received IP datagram are given as arguments (Header, Size).

First, in step S501, the CPU 101 creates a new management entry for the management table 202. In step S502, object information (source address, destination address, identification) of the Header argument is set as the source address 301, the destination address 302, and the identifier 303 of the newly created management entry. In step S503, a Size argument is set for the bit table unit size 304 of the newly created management entry.

In step S504, a bit table size is acquired from the set bit table unit size 304. Specifically, the bit table size is calculated by dividing the IP datagram maximum payload size of 64 Kbytes by the unit size.

For example, if the set bit table unit size 304 is 1 Kbyte, then the bit table size is calculated using the following calculating formula as 64 bits.

64 Kbytes÷1 Kbyte=64 bits

Alternatively, there may be cases where 64 Kbytes is not evenly divisible by Size (bit table unit size). In such a case, the bit table size is calculated by rounding up the fractional part. For example, if the unit size is 3 Kbytes, since the result of the division is 21.3333 . . . , the fractional part is rounded up to arrive at 22 bits.

In step S505, a bit table is generated in the bit table area 203 based on the bit table size acquired in step S504. In step S506, the generated bit table is initialized. Bit table initialization is performed by setting all bits of the bit table area 203 shown in FIG. 2 to "0".

Finally, in step S507, a storage address of the generated bit table is set in the bit table pointer 305 of the management entry newly created in step S501, thereby concluding the reset reassembly process.

Figure 6:
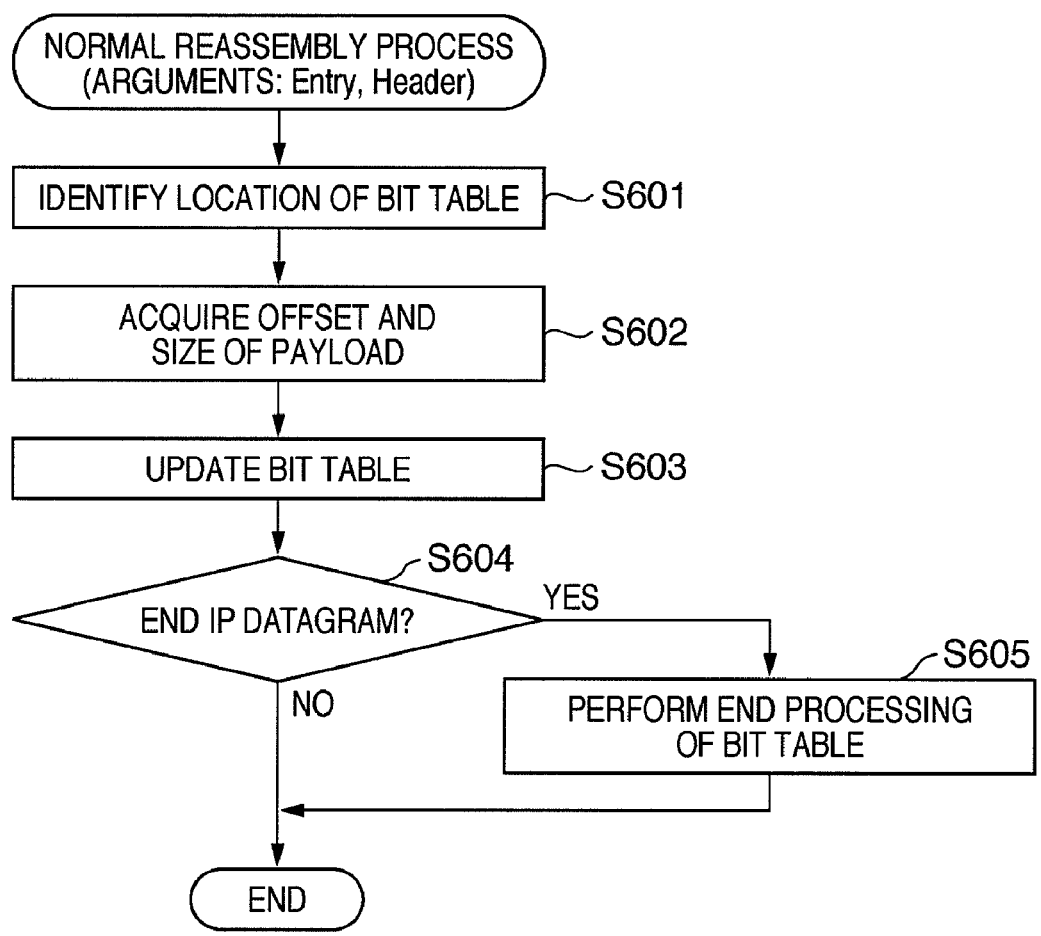
FIG. 6 is a flowchart showing a processing procedure of a normal reassembly process.

FIG. 6 is a flowchart showing a processing procedure of the normal reassembly process. This process is performed upon receipt of a fragmented IP datagram. In addition, although a detailed description will be given later, a search of the management table 202 is performed upon receipt of a fragmented IP datagram in order to confirm whether a management entry consistent with the IP header information of the received IP datagram exists or not. When the search reveals that a consistent management entry exists, the IP header information of the received IP datagram and the consistent management entry are given as arguments (Header, Entry). When a consistent management entry does not exist, a management entry is newly created by the reset reassembly process (FIG. 5) described above, whereby the management entry is given as an argument (Entry).

In addition, it is assumed that an analysis of Header has been performed in advance, the payload data of the received IP datagram is consistent with the bit table unit size, and reception status can be accurately reflected onto the bit table. Specifically, the following two conditions must be met.

Firstly, the payload size of the received IP datagram and the bit table unit size have an integral ratio of N:1 (payload size: unit size). However, this does not apply if the received IP datagram is an IP datagram bearing the payload data segment (hereinafter referred to as an end IP datagram) within the payload data prior to fragmentation.

Secondly, an offset (starting position) of the received IP datagram within payload data prior to fragmentation and the bit table unit size similarly have an integral ratio of N:1 (offset: unit size).

By satisfying the above two conditions, a situation in which a corresponding bit does not exist can be avoided when reflecting the payload data reception status onto a bit table.

First, in step S601, the CPU 101 identifies a storage location of an associated bit table from the bit table pointer 305 of the argument Entry. In step S602, an offset and a payload size indicating a position among all payload data of the payload data of the IP datagram received from the argument Header are acquired.

In this case, the offset is precisely the value indicated by a Fragment Offset field in the Header. In addition, the payload size is to be calculated by an IHL field and a Total Length field in the Header. The IHL field is the number of words (1 word=4 bytes) in the header of an IP datagram, while the Total Length field is the length of an entire IP datagram (number of bytes). In other words, a payload size can be calculated using the following calculating formula.

Payload size (bytes)=Total Length field−(IHL field×4)

For example, if the Total Length field is 1044 bytes and the IHL field is 5, then the payload size is calculated as 1 Kbyte from the following calculating formula.

1044−(5×4)=1024 bytes=1 Kbyte

After acquiring the offset and the payload size by the method described above, in step S603, "1" is set to bits corresponding to received portions among the payload data prior to fragmentation in the identified bit table.

For example, assume that the bit table unit size is 1 Kbyte, the offset is 0 (zero), and the payload size is 3 Kbytes. In this case, "1" is set to 3 bits from the top of the bit table.

In another example, assume that the bit table unit size is 512 bytes, the offset is 2 Kbytes, and the payload size is 1 Kbyte. In this case, "1" is set to 2 bits from the fifth bit of the bit table.

There is a precaution that must be observed when performing the process of step S603. That is, special attention is necessary to cases where the payload size of the received IP datagram is not an integer multiple of the bit table unit size or, in other words, in cases with fractional remainders. Before the normal reassembly process, it is assumed that the payload data size and the offset conform to the bit table unit size. Therefore, normally, the payload size is an integer multiple of the bit table unit size.

However, when the received IP datagram is an end IP datagram, remainders may exist. Since the remainders are handled in end processing in step S605, remainders are not treated in step S603.

Therefore, if, in the same manner as the example described above, the bit table unit size is 512 bytes, the offset is 2 Kbytes, and the payload size is 1025 bytes (=1 Kbyte+1 byte) "1" is set to 2 bits from the fifth bit of the bit table. Subsequently, processing of the 1 byte remainder is to be performed in step S605.

After updating the bit table in step S603, in step S604, confirmation is made regarding whether the received IP datagram is an end IP datagram or not. Specifically, since a subsequent datagram exists if the MF (More Fragments flag) of the Header is "1", the received IP datagram is determined not to be an end IP datagram. On the other hand, if "0", it is determined that there are no subsequent datagrams or, in other words, that the received IP datagram is an end IP datagram.

At this point, when the received IP datagram is determined to be an end IP datagram, in step S605, bit table end processing is performed. Specifically, all of the bits subsequent to a portion of the bit table corresponding to the received IP datagram are set to "1". Accordingly, when all the bits of the bit table are set to "1", it is determined that all fragmented IP datagrams have been received or, in other words, reassembly is complete.

The bit table end processing is not limited to the method described above and may be realized by other methods. That is, the present invention can be applied to any realization method as long as such a method enables the conclusion of reassembly to be clearly determined.

In addition, processing of the remainders in an end IP datagram ignored in step S603 is also performed in step S605. This does not mean that particular processing is to be performed. Rather, in the same manner as in the end processing described above, all of the bits subsequent to a portion of the bit table containing the fragment of the received IP datagram is set to "1". Accordingly, end processing can be performed regardless of the presence/absence of fragments.

The normal reassembly process is concluded both when bit table end processing is performed in step S605 and when it is determined in step S604 that the received IP datagram is not an end IP datagram.

Figure 7:
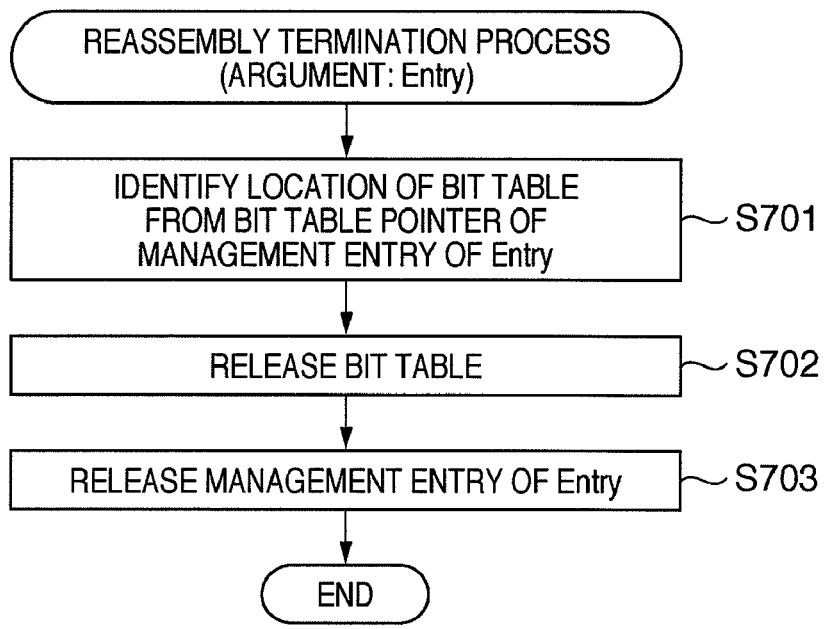
FIG. 7 is a flowchart showing a processing procedure of a reassembly termination process.

FIG. 7 is a flowchart showing a processing procedure of a reassembly termination process. This processing is performed upon termination of reassembly. It is assumed that prior to the execution of this processing, the normal reassembly process (FIG. 6) has been executed, a determination has been performed regarding whether reassembly is complete or not, and a determination has been made that reassembly is complete. Whether or not reassembly is complete is determined based on the management entry on which the normal reassembly processing had been executed. Therefore, the management entry on which reassembly is complete is identified before executing this processing. In addition, the management entry is given as an argument Entry to this processing.

First, in step S701, the CPU 101 identifies a storage location of an associated bit table from the bit table pointer 305 of the management entry given as the argument (Entry). In step S702, the identified bit table is released from the bit table area 203. In this case, "releasing the bit table" means that the storage location of the bit table to be released is arranged so as to be subsequently freely usable. More specifically, this means that when generating a bit table in the reset reassembly process of step S505, the area of the released bit table is made usable.

Finally, in step S703, the management entry of the argument (Entry) is released from the management table 202. This step concludes the reassembly termination process.

Figure 8:
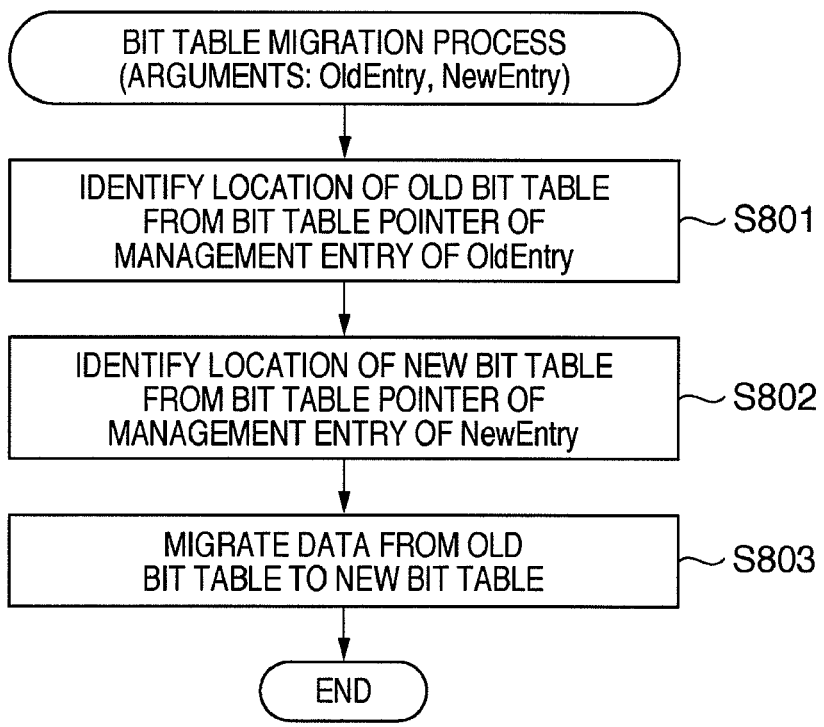
FIG. 8 is a flowchart showing a processing procedure of a bit table migration process.

FIG. 8 is a flowchart showing a processing procedure of a bit table migration process. This processing is performed when a bit table unit size is changed. Moreover, prior to the execution of this process, a management entry storing management information of the bit table prior to a unit size change (hereinafter referred to as an old management entry) has been identified. In addition, a management entry storing management information of the bit table after the unit size change (hereinafter referred to as a new management entry) has also been identified.

Furthermore, a bit table associated with the bit table pointer 305 of the aforementioned old management entry shall be referred to as an old bit table and the bit table unit size 304 thereof as an old unit size. Similarly, a bit table associated with the bit table pointer 305 of the new management entry shall be referred to as an new bit table and the bit table unit size 304 thereof as a new unit size.

While a detailed description will be given later, the new unit size is set so as to achieve an integral ratio of 1:N or N:1 with respect to the old unit size. For example, in the case of N:1 (old unit size: new unit size), if the old unit size is 1 Kbyte, then the new unit size is any of 512, 256, 128, 64, 32, 16, and 8 bytes.

Since a bit table unit size is dependent on the minimum value of 8 bytes of the payload of a fragmented IP datagram, a value under 8 bytes cannot be set.

On the other hand, in the case of 1:N (old unit size: new unit size), it is possible that the reception status of the old bit table cannot be migrated to the new bit table. For example, consider a case where the old unit size is 512 bytes, the new unit size is 1 Kbyte, and the reception status is that only the first 512 bytes' worth of payload data have been received. In this case, the first 512 bytes' worth of payload data cannot be brought into correspondence with the first 1 bit at the top of the new bit table. That is, setting the bit to "1" will mean that 1 Kbyte's worth of payload data that is the unit size has already been received.

In addition, setting "0" will signify a non-reception in which 512 bytes' worth of payload data has not been received.

In the present embodiment, it is assumed that old unit sizes and new unit sizes for which a reception status indicated by an old bit table cannot be migrated to a new bit table as described above are not to be provided to the present bit table migration process. In other words, when the old unit size is 512 bytes and the new unit size is 1 Kbyte, the reception status indicated by the old bit table is premised on both the received portion and unreceived portion being in 1 Kbyte-units.

In addition, a new management entry is created prior to this process in step S501 of the reset reassembly process and a new bit table is initialized in step S506 of the reset reassembly process.

Moreover, in the bit table migration process, as described above, the new unit size and the old unit size have an integral ratio, and the old management entry and the new management entry are given as arguments OldEntry and NewEntry, respectively.

First, in step S801, the CPU 101 identifies a storage location of the old bit table from the bit table pointer 305 of the old management entry given as the argument (OldEntry). In step S802, the CPU 101 identifies a storage location of the new bit table from the bit table pointer 305 of the new management entry given as the argument (NewEntry).

Finally, in step S803, the reception status of the payload data of the old bit table is migrated to the new bit table. Reception status migration is performed based on information of a portion in the old bit table which is set to "1" or, in other words, a received portion among the payload data prior to fragmentation by setting "1" to corresponding bits in the new bit table.

The process of step S803 will now be described using a specific example. First, a case will be described in which the old unit size and the new unit size have a relationship of N:1 (old unit size new unit size).

Assume now that the old unit size is 1 Kbyte and the new unit size is 512 bytes. In addition, assume that "1" is set to the first 3 bits of the old bit table. This means that 3 Kbytes' worth of data from the top of the payload data has been received. Therefore, migration to the new bit table is performed by setting "1" to the first 6 bits (3 Kbytes=512 bytes×6).

As an alternate example, assume that the old unit size is 1 Kbyte, the new unit size is 512 bytes, and that "1" is set to 2 bits from the 5th bit of the old bit table. This means that 2 Kbytes' worth of data from an offset of 4 Kbytes from the top of the payload data has been received. Therefore, migration to the new bit table is performed by setting "1" to 4 bits from the 9th bit (2 Kbytes=512 bytes×4).

Next, a case will be described in which the old unit size and the new unit size have a relationship of 1:N (old unit size: new unit size). Assume that the old unit size is 512 bytes and the new unit size is 1 Kbyte. In addition, assume that "1" is set to the first 4 bits of the old bit table. This means that 2 Kbytes' worth of data from the top of the payload data has been received.

Therefore, migration to the new bit table is performed by setting "1" to the first 2 bits (2 Kbytes=1 Kbyte×2). From the assumptions described above, when bits to which "1" is set are consecutive, consecutive bits are arranged in 2-bit units. In addition, when bits to which "0" is set are consecutive, consecutive bits are similarly arranged in 2-bit units. As a result, predetermined bits are prevented from becoming unmappable during the migration to the new bit table.

The migration of bit table information performed in step S803 concludes the bit table migration process.

A processing procedure performed by the protocol processing apparatus upon receipt of an IP datagram will now be described with reference to FIG. 9. This processing is triggered by the reception of an IP datagram and is executed by the CPU 101. In addition, when the received IP datagram has been fragmented, the four processes described above are executed to perform reassembly. In other words, the reset reassembly process (FIG. 5), the normal reassembly process (FIG. 6), the reassembly termination process (FIG. 7), and the bit table migration process (FIG. 8) described above are executed.

Figure 9:
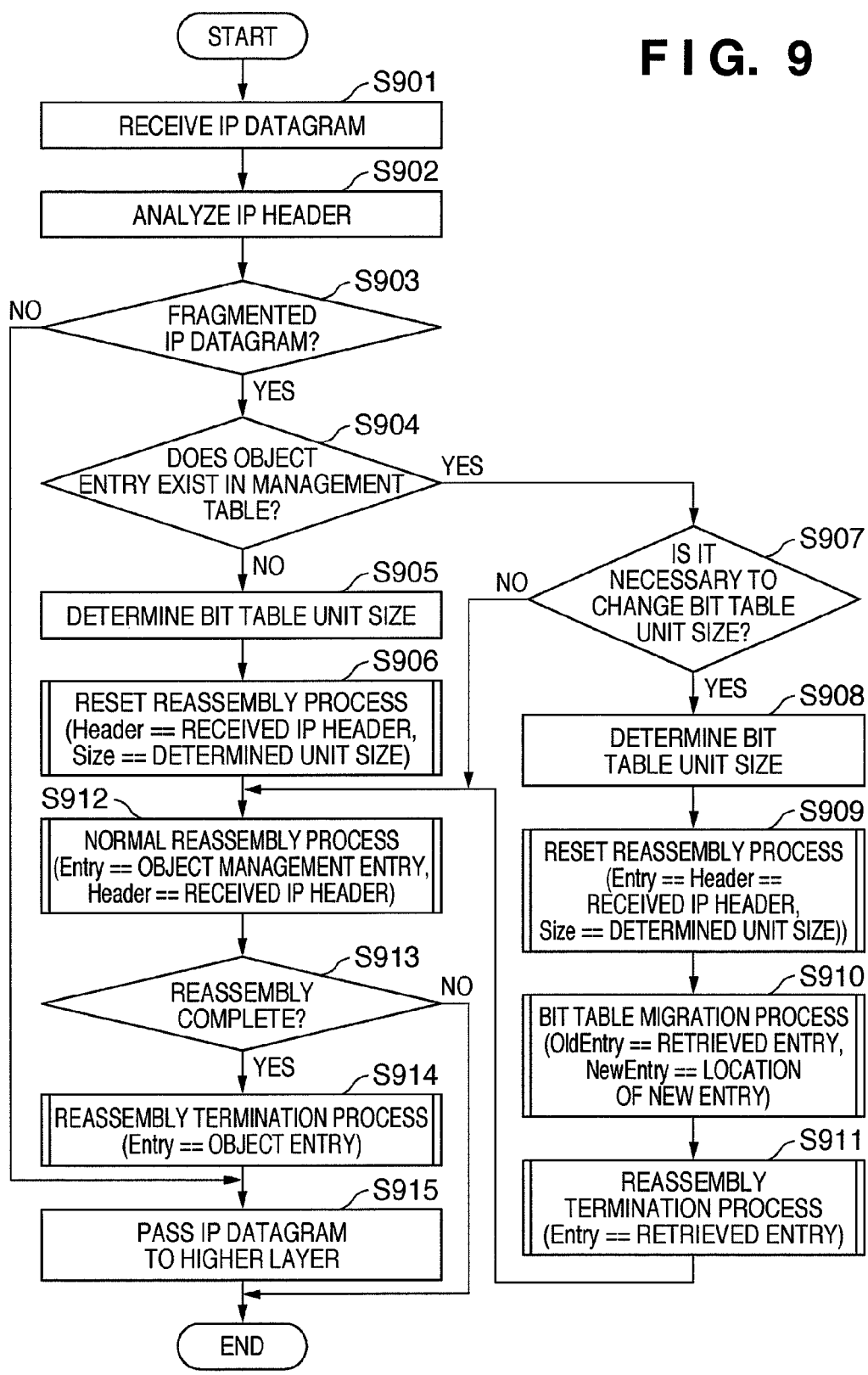
FIG. 9 is a flowchart showing IP datagram reception processing according to the present embodiment.

FIG. 9 is a flowchart showing IP datagram reception processing according to the present embodiment. First, in step S901, an IP datagram is received. The IP datagram is temporarily received by the MAC 104 from an external source via the PHY 105. Subsequently, the IP datagram is transferred by the DMAC 106 to the received data area 201 in the RAM 103 via the bus 107. At this point, instead of using the DMAC 106, the received data may instead be transferred by the CPU 101 to the received data area 201.

In step S902, the CPU 101 analyzes the IP header of the received IP datagram. The IP datagram received in step S901 is referred to as a received IP datagram; the IP header of the received IP datagram as a received IP header; and the payload data of the received IP datagram as a received payload. In addition, similar to the description on the normal reassembly process, an IP datagram having an end-portion payload among the payload prior to fragmentation is referred to as an end IP datagram.

In step S903, a determination is made regarding whether the received IP datagram is fragmented or not based on a result of the analysis of the received IP header performed in step S902. In this case, the determination is made based on the MF (More Fragments flag) and the Fragment Offset field of the received IP header.

Specifically, first, it is confirmed whether the MF has been set (in the case of "1"). When the MF has been set, the received IP datagram is not an end IP datagram. When the MF has not been set, the received IP datagram is either not to be fragmented or is an end IP datagram.

When the MF has not been set, the Fragment Offset field is further confirmed. A Fragment Offset field of "0" means that the received IP datagram is not fragmented. However, a Fragment Offset field of a value other than "0" means that the received IP datagram is an end IP datagram.

Therefore, when the MF has been set, the received IP datagram is determined to be fragmented. In addition, when the MF has not been set and the Fragment Offset field is a value other than "0", the received IP datagram is determined to be fragmented. Furthermore, when the MF has not been set and the Fragment Offset field is "0", the received IP datagram is determined to be an unfragmented normal IP datagram.

When it is determined in step S903 described above that the received IP datagram is fragmented, the procedure advances to step S904 to search the management table 202 so as to confirm whether a management entry consistent with the received IP header exists or not. This processing is performed to confirm whether the source address, the destination, and the identification in the received IP header are respectively consistent with the source address 301, the destination address 302, and the identifier 303 of the management entry.

At this point, the absence of management entries for which the three aforementioned items are consistent means that the reassembly of the received IP datagram has not been started or, in other words, the reassembly of the IP datagram containing the received IP header must be started. To this end, in step S905, a bit table unit size to be provided to the reset reassembly process is determined.

A method of determining a bit table unit size performed in step S905 will now be described. The bit table unit size is determined to be any of the common divisors of the payload size of the IP datagram received in step S901 and the payload data offset. In other words, any of the common divisors of the payload size of the fragmented IP datagram received first and the offset of the payload data prior to fragmentation of the payload is determined as the unit size. For example, if the payload size is 512 bytes and the offset is 3 Kbytes, then the unit size is any of 512, 256, 128, 64, 32, 16, and 8 bytes. Since a bit table unit size is dependent on the minimum value of 8 bytes of the payload of a fragmented IP datagram, a value under 8 bytes cannot be set. Obviously, the bigger the bit table unit size, the smaller the size of the bit table body. Therefore, in the example described above, memory usage can be most reduced when selecting 512 bytes that is the greatest common divisor.

Moreover, a configuration is also possible in which different processing is performed when the received IP datagram is an end IP datagram. The payload size of the end IP datagram is a fractional remainder of the payload size prior to fragmentation divided by a predetermined size. In this case, it is readily assumed that generating a bit table using the payload size of the end IP datagram as a unit size will necessitate changing the bit table unit size when receiving a subsequent IP datagram.

Therefore, a method may be adopted in which, for example, regardless of the payload size of an end IP datagram, a unit size is determined by predicting the payload size of another IP datagram from the offset (starting position) of the payload data.

In addition, for example, a method may be adopted in which processing is put on hold in the case of an end IP datagram. In other words, this is a method in which, when receiving a subsequent IP datagram that is not an end IP datagram, processing of the end IP datagram is recommenced after configuring a bit table using the payload size of the subsequent IP datagram. The present invention is applicable to any of the methods described above or to other methods as long as the unit size is determinable in step S905.

After the bit table unit size is determined, in step S906, the reset reassembly process is executed. At this point, the bit table unit size determined in step S905 is provided as the argument Size. In addition, the received IP header is provided as the argument Header. After the reset reassembly process is executed in step S906, the procedure advances to the normal reassembly process.

On the other hand, when a management entry consistent with the received IP header is found in step S904, the procedure advances to step S907. This means that reassembly on the received IP datagram has already started. Therefore, in step S907, it is checked whether the existing bit table unit size must be changed or not, and if so, the procedure advances to step S908 to acquire a changed bit table unit size.

The management entry found to be consistent in step S904 is referred to as an existing management entry, a bit table associated with an existing management entry is referred to as an existing bit table, and a unit size of an existing bit table is referred to as an existing unit size. In addition, the bit table subjected to the reset reassembly process in step S909 is referred to as a new bit table and a bit table unit size to be determined in step S908 is referred to as a new unit size.

A description will now be given of a method for determining the need to change an existing unit size in step S907 and a method of determining the existing unit size in step S908 respectively described above.

In step S907, when the MF bit of the received IP header has not been set or, in other words, in the case of an end IP datagram, it is determined that the existing unit size need not be changed. On the other hand, when the received IP datagram is not an end IP datagram and any of the following conditions are met, it is determined that the existing unit size needs to be changed.

<Condition A> Neither the data size of the received payload nor the offset thereof (starting position in payload data prior to fragmentation) is an integer multiple of the existing unit size. That is, neither the payload size of the received fragmented IP datagram nor the offset in the payload data prior to fragmentation are integer multiples of the existing unit size. In this case, the reception status of the payload data of the received fragmented IP datagram cannot be set to the existing bitmap table generated using a predetermined unit size.

<Condition B> Let consecutive bit numbers forming a portion in which "1" is consecutive in the existing bit table be denoted, starting at the top, as N1_1, N1_2, N1_3, ..., and the greatest common divisor of these integrals as N1_GCD. In addition, let consecutive bit numbers forming a portion in which "0" is consecutive be denoted, starting at the top, as N0_1, N0_2, N0_3, ..., and the greatest common divisor of these integrals as N0_GCD. Furthermore, let the greatest common divisor of the two integrals N1_GCD and N0_GCD be denoted as N0_GCD. In this case, if a predetermined divisor of N0_GCD other than 1 is denoted as M, then a divisor M exists for which the data size and the offset of the received payload satisfies the following conditions: the data size of the received payload is an integer multiple of (M×bit table unit size prior to change), and the offset of the received payload is an integer multiple of (M×bit table unit size prior to change).

Next, a method of determining a new unit size performed in step S908 will be described using specific examples satisfying conditions A and B described above.

As an example satisfying the aforementioned condition A, consider a case where the existing unit size is 1 Kbyte and the data size of the received payload is 512 bytes. In this case, since the received payload data is smaller than the existing unit size, the received payload data cannot be brought into correspondence with predetermined bits in the existing bit table.

Moreover, with this example, further consider a case where the offload of the received payload is 768 bytes. In this case, the received payload data ends up starting at the middle of a data area corresponding to predetermined bits in the existing bit table. Consequently, the received payload data cannot be brought into correspondence with predetermined bits in the existing bit table.

Therefore, in either example, the new unit size to be determined in step S908 must be set smaller than the existing unit size. The method of determining a new unit size in step S908 when the aforementioned condition A is satisfied involves determining a common divisor of the three integers, namely, the data size of the received payload, the offset of the received payload, and the existing unit size. In other words, the method involves determining a unit size of a bitmap table based on the payload size of the received fragmented IP datagram, the offset of the payload data among the payload data prior to fragmentation, and the existing unit size. With a bit table whose unit size is a common divisor of the data size of the received payload and the unit size of the bit table prior to change, the received payload data can be brought into correspondence with predetermined bits of the bit table.

In addition, with a bit table whose unit size is a common divisor of the offset of the received payload and the unit size of the bit table prior to change, the received payload data can be prevented from starting at the middle of a data area corresponding to predetermined bits in the bit table. Therefore, correspondence can be made to predetermined bits. Furthermore, since the existing unit size is an integer multiple of the new unit size, the reception status of the existing bit table can be accurately migrated to the new bit table.

In the aforementioned example, the new unit size is a common divisor of 512 bytes that is the received payload size, 768 bytes that is the offset of the received payload, and 1 Kbyte that is the unit size of the bit table prior to change. In other words, the new unit size is any of 256, 128, 64, 32, 16, and 8 bytes. Since a bit table unit size is dependent on the minimum value of 8 bytes of the payload of a fragmented IP datagram, a value under 8 bytes cannot be set. Obviously, the bigger the bit table unit size, the smaller the size of the bit table body. Therefore, in the example described above, memory usage can be most greatly reduced when selecting 256 bytes; that is, when selecting the greatest common divisor.

Figure 10:
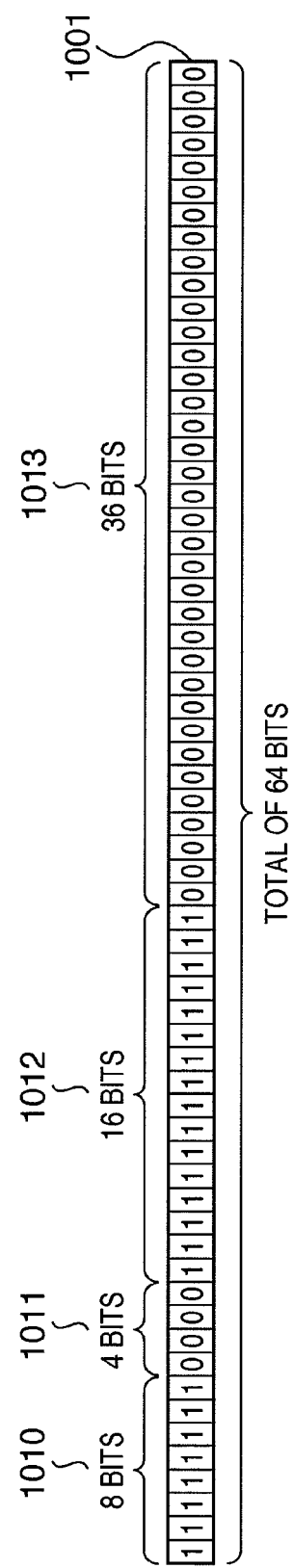
FIG. 10 is a diagram showing an example of a case where a condition B is met according to an embodiment of the present invention.

Next, as an example satisfying the aforementioned condition B, consider a case where the existing unit size is 1 Kbyte, and in the reception status shown in FIG. 10, the data size of the received payload is 4 Kbytes and the offset of the received payload is 6 Kbytes.

In FIG. 10, reference numeral 1001 denotes an existing bit table body consisting of 64 bits since the unit size is 1 Kbyte. The left end of the bit table 1001 represents the top of payload data and the right end thereof represents the end of payload data. In the bit table 1001, there are two portions having consecutive bits to which "1" (received) is set, namely, reference numerals 1010 and 1012. Reference numeral 1010 denotes 8 consecutive "1" bits, while reference numeral 1012 denotes 16 consecutive "1" bits.

On the other hand, there are two portions having consecutive bits to which "0" (unreceived) is set, namely, reference numerals 1011 and 1013. Reference numeral 1011 denotes 4 consecutive "0" bits, while reference numeral 1013 denotes 36 consecutive "0" bits. Under the aforementioned condition B, since N1_1=8 and N1_2=16, we get N1_GCD=8 (the greatest common divisor of 8 and 16). Meanwhile, since N0_1=4 and N0_2=32, we get N0_GCD=4 (the greatest common divisor of 4 and 32). Moreover, from N1_GCD (=8) and N0_GCD (=4), we get N0_GCD=4 (the greatest common divisor of 4 and 8).

In this case, when considering a divisor M of N01_GCD (=4), it is found that the divisor M is any of 4, 2, or 1. This means that the bit table 1001 is capable of changing the unit size by a factor of M. This is obviously true in the case of M=1 since the unit size remains unchanged.

Bit tables after tentatively changing the unit size of the bit table 1001 in the cases of M=4 and M=2 are shown in FIG. 11. In FIG. 11, reference numeral 1101 represents a bit table body in the case of M=4 or, in other words, when the unit size is changed to 4 Kbytes. Reference numeral 1102 represents a bit table body in the case of M=2 (unit size=2 Kbytes).

In FIG. 11, reference numerals 1110 and 1112 represent portions having consecutive bits to which "1" (received) is set. Reference numeral 1110 represents 2 consecutive bits from the top, and corresponds to reference numeral 1010 that is the 8 bits similarly consecutive from the top of the bit table 1001 prior to change. In other words, while the bit table unit size has been multiplied by 4, the number of consecutive bits has decreased by ¼, and both reception statuses indicate that 8 Kbytes' worth of payload data from the top has been received. In addition, the same reasoning applies to reference numeral 1112 (4 consecutive bits of "1" in the case of M=4 shown in FIG. 11) and reference numeral 1012 (16 consecutive bits of "1" shown in FIG. 10).

On the other hand, reference numerals 1111 and 1112 represent portions having consecutive bits to which "0" (unreceived) is set. Reference numeral 1111 represents 1 consecutive bit from the third bit, and corresponds to reference numeral 1011 that is the 4 bits similarly consecutive from the 9th bit of the bit table 1001 prior to change. In other words, while the bit table unit size has been multiplied by 4, the number of consecutive bits has decreased by ¼, and both reception statuses indicate that 4 Kbytes' worth of payload data from the offset of 8 Kbytes has not been received. In addition, the same reasoning applies to reference numeral 1113 (8 consecutive bits of "0" in the case of M=4 shown in FIG. 11) and reference numeral 1013 (32 consecutive bits of "0" shown in FIG. 10).

Therefore, the bit table 1001 and the bit table 1101 tentatively changed using a unit size multiplied by 4 indicate the same reception status. Similarly, the bit table 1001 and the bit table 1102 tentatively changed using a unit size multiplied by 2 also indicate the same reception status. In other words, with respect to a divisor M of N01_GCD (=4), the reception status of the bit table 1001 can be migrated even when the unit size is multiplied by M.

It is pointless to migrate only the reception status if the received payload data cannot be mapped to predetermined bits in the new bit table. In order to map the payload data of the received IP datagram onto predetermined bits, as described for the condition A above, it is required that the new unit size be a common divisor of the three integers, namely, the data size of the received payload, the offset of the received payload, and the existing unit size. Therefore, for condition B, among the divisors M of N0_GCD, the following two conditions must be met: the data size of the received payload is an integer multiple of (M×existing unit size), and the offset of the received payload is an integer multiple of (M×existing unit size). In this case, (M×existing unit size) indicates the new unit size. Accordingly, the method of determining the new unit size performed in step S508 can be described as determining a divisor M satisfying the above conditions and calculating (M×existing unit size).

Furthermore, in the example described above, assume that the received payload size is 4 Kbytes and the offset of the received payload is 6 Kbytes. In this case, if M=4, since the new unit size is 4 Kbytes and the offset of the received payload is not an integer multiple of 4 Kbytes, the above conditions are not met. If M=2, since the new unit size is 2 Kbytes and the received payload size and the offset of the received payload are both integer multiples of 2 Kbytes, the above conditions are met. Therefore, in step S908, the new unit size is calculated to be 2 Kbytes.

Here, in the determination of step S907, a change to the unit size can be determined to be necessary even when the received IP datagram is not an end datagram and the aforementioned condition B is met. The reception status of received payload data normally manageable using the existing bit table, and indicates whether a state exists in which the unit size can be changed to a bigger unit size with a view to reduce the bit table size. Therefore, when the aforementioned conditions are met, either decision can be made in consideration of the effects of memory usage reduction by a change in the bit table unit size and a subsequent reduction in the bit table size as well as an increase in the load on the CPU 101 due to the bit table change.

As described above, in step S907, it is checked whether the existing unit size needs to be changed or not. If so, the procedure advances to step S908 to acquire a new unit size. Subsequently, in step S909, the reset reassembly process is executed. At this point, the new unit size determined in step S908 is provided as the argument Size (bit table unit size). In addition, the received IP header is provided as the argument Header (IP header). By executing the reset reassembly process in step S909, a new bit table, whose unit size is set to the new unit size, and a management entry, with which the new bit table is associated, are generated.

Subsequently, in step S910, the bit table migration process is executed. At this point, the existing management entry is provided as the argument OldEntry and the management entry generated in step S909 is provided as the argument NewEntry. By executing the bit table migration process in step S910, the payload data reception status of the existing bit table is migrated to the new bit table.

In the subsequent step S911, the reassembly termination process is executed to release the existing management entry and the existing bit table associated with the existing management entry. The reassembly termination process is executed by providing the existing management entry as the argument Entry.

In step S912, the normal reassembly process is executed. At this point, the management entry of the received IP datagram is provided as the argument Entry. If the processing had proceeded from step S906, the management entry of the received IP datagram would indicate that the management entry was found to be consistent in step S904. The management entry found to be consistent in step S904 is similarly provided that it is determined in step S907 that the existing unit size need not be changed. On the other hand, if the processing had proceeded from step S911, the management entry generated in step S910 is provided. In addition, the received IP header is provided as the argument Header.

In the subsequent step S913, it is confirmed whether reassembly is complete or, in other words, whether all payload data of the fragmented IP datagram has been received. That reassembly is complete is confirmed by determining whether or not all bits of the bit table associated with the current management entry are "1".

However, this does not hold true if end processing has not been performed in the aforementioned method in step S906 (end processing of bit table) of the normal reassembly process. The aforementioned end processing involves setting all of the bits subsequent to a portion of the bit table corresponding to the received IP datagram to "1". In any case, confirming whether or not reassembly is complete depending on the end processing performed in the normal reassembly process shall suffice.

When it is determined in step S913 that reassembly is not complete, the current processing is terminated and performed again upon receipt of the next IP datagram. However, when it is determined that reassembly is complete, the procedure proceeds to step S914 to execute the reassembly termination process. At this point, the current management entry is provided as the argument Entry. The reassembly termination process releases the management entry and the bit table associated with the management entry. Subsequently, in step S915, payload data prior to fragmentation for which reassembly is complete is passed to a higher layer.

On the other hand, when it is determined in the aforementioned step S903 that the received IP datagram is not fragmented, the procedure advances to step S915 to pass the payload data to the higher layer. While this higher layer is normally software that performs TCP processing, the higher layer is not specifically limited in the present embodiment.

In addition, since the reassembled payload data is a combination of payload data of a plurality of IP datagrams, a processing module for synthesizing payload data itself becomes necessary. While this processing is generally performed in software, the module for performing this processing is not specifically limited in the present embodiment.

According to the present embodiment, when managing the payload data reception status during reassembly with a bit table, the data size of a bit table originally requiring 8192 bits for each IP datagram that is a reassembly object can be reduced. Consequently, the amount of data in the RAM 103 to be used by the bit table can be reduced.

Moreover, while the present embodiment has been described on the premise of performing network protocol reassembly upon reception of an IP datagram, performing reassembly need not necessarily be triggered by the reception of an IP datagram. Depending on how a protocol processing apparatus is implemented, an implementation is conceivable in which processing is started when, for example, a certain amount of received IP datagrams have accumulated. The present invention can be implemented as long as an IP datagram is received and stored in a received data area 201 on the RAM 103. Therefore, it is obvious that the present invention is applicable even to a configuration such as that described above.

In addition, the present embodiment does not in any way diminish the applicable scope of the present invention even when a management entry and a bit table cannot be generated due to insufficient capacity of the management table 202 and the bit table area 203. For example, when a management entry and a bit table cannot be generated, reassembly may be abandoned and the IP datagram may be discarded at that point.

In an ordinary protocol processing apparatus, since the number of parallel-executable reassembly processes is limited, reassembly is never performed beyond this limit. Furthermore, the contents of the present invention are to be applied to the IP (network) layer of the TCP/IP protocol suite, and a mechanism for requesting retransmission of TCP packets not received within a certain amount of time is defined in by the upper layer protocol TCP.

Accordingly, even after reassembly is abandoned at the IP layer, relevant data may arrive again from the transmitting device due to a retransmission request performed at the TCP layer level.

Additionally, in the present embodiment, when the need arises to change the unit size of a bit table during reassembly, a bit table is reconfigured using a common divisor of related parameters. While the present embodiment is arranged so as to be capable of reducing memory usage during such bit table reconfiguration by using the greatest common divisor, a tradeoff between the reduction in memory usage and the processing load on the CPU 101 exists therein.

In other words, when the payload sizes of fragmented IP datagrams are not uniform, it is often the case that the path between a transmitting device and a protocol processing apparatus traverses a WAN or the like. Subsequently, it is readily presumed that the payload size of the received IP datagram is also likely to be different. When payload sizes of subsequent IP datagrams respectively differ, there is a possibility that the reset reassembly process and the bit table migration process must be performed for every reception.

This risks an increase in the load on the CPU 101 and a decrease in the processing capacity of the entire data packet processing apparatus.

Therefore, when a need arises to change the unit size of a bit table during reassembly, in order to avoid having to change the unit size again, the unit size of a bit table may be reconfigured by setting the bit table unit size to 8 bytes (minimum unit) regardless of the related parameter values. Even when adopting such a configuration, the effect of the present invention can be expected when performing reassembly in a case where the communication path is a LAN or the like and the payload sizes of IP datagrams are constant.

In addition, while methods for allocating and releasing management entries and bit tables in the RAM 103 have not been clearly described in the present embodiment, it is obvious that the present invention is applicable regardless of the methods employed. For example, with a regular processing apparatus, when securing fixed-length data areas, a predetermined number data areas are often allocated in advance and flags or the like indicating usage of the respective data areas are prepared, whereby allocation and deallocation are managed using the flags.

Additionally, when allocating a variable-length data area, allocation and deallocation of a data area of a predetermined size are often managed using software such as a file system. In either case or with any other method, the present invention is applicable as long as management entries and bit tables can be secured and released.

Furthermore, in the present embodiment, the bit table migration process has been described on the premise that the old unit size and the new unit size have a ratio of 1:N or N:1. However, the reception status can be appropriately mapped onto bits of a new bit table even in a relationship of N:M (where N and M are relatively prime integers). That is, the present invention can be applied as long as reception status migration is possible. In other words, this refers to a case satisfying the condition: in the old bit table, the numbers of bits for which "1" is consecutive are all integer multiples of M and the numbers of bits for which "0" is consecutive are all integer multiples of M.

Moreover, the present embodiment has been described on the premise that the method of determining the old unit size and the new unit size (step S908 shown in FIG. 9) when calling the bit table migration process determines the old unit size and the new unit size so as to have a ratio of 1:N or N:1. However, the present invention can be applied by adopting a premise whereby the aforementioned bit table migration process is capable of accommodating an old unit size and a new unit size having a ratio of N:M (where N and M are relatively prime integers). In this case, performing step S908 so as to determine an old unit size and a new unit size having a ratio of N:M shall suffice. If an old unit size and a new unit size having a ratio of N:M can be determined in step S908, the condition B of step S907 can be modified to condition B1 below.

<Condition B1> Let consecutive bit numbers forming a portion in which "1" is consecutive in the current bit table is denoted, starting at the top, as N1_1, N1_2, N1_3, . . . . In addition, let the products of the respective bits and the current bit table unit size is denoted as N1_1_MULTI, N1_2_MULTI, N1_3_MULTI, . . . . In addition, let the greatest common divisor of the integral products obtained by multiplying the unit size be denoted as N1_MULTI_GCD. Furthermore, let consecutive bit numbers forming a portion in which "0" is consecutive be denoted, starting at the top, as N0_1, N0_2, N0_3, . . . . In addition, let the products of the respective bits and the current bit table unit size be denoted as N0_1_MULTI, N0_2_MULTI, N0_3_MULTI, . . . . In addition, let the greatest common divisor of the integral products obtained by multiplying the unit size be denoted as N0_MULTI_GCD. Furthermore, let the greatest common divisor of the two integrals N1_MULTI_GCD and N0_MULTI_GCD be denoted as N0_MULTI_GCD. In this case, if a predetermined divisor of N0_MULTI_GCD other than 1 is denoted as M, then a divisor M satisfying the following condition exists: the data size of the received payload is an integer multiple of (M×bit table unit size prior to change), and the offset of the received payload is an integer multiple of (M×bit table unit size prior to change).

In step S908 when the condition B1 is applied, in the same manner as in the case of the condition B described earlier, (M×unit size of existing bit table) becomes a candidate for the unit size of the new bit table to be acquired.

According to the present embodiment, by configuring a bit table with a unit size of 8 bytes or greater during reassembly in protocol processing, the bit table size can be reduced. Consequently, the memory area required for reassembly can be reduced, in turn enabling performance deterioration in protocol processing to be suppressed and the cost during system construction to be reduced. In particular, a significant advantage can be expected in an embedded system or the like in which memory areas are limited.

Furthermore, in intra-LAN communication which does not go through a WAN, since communication does not take place via a router, the payload size of fragmented IP datagrams is fixed. Therefore, the present invention offers a significant advantage. WAN is an abbreviation for wide area network while LAN is short for local area network.

Moreover, even when communication is carried out through a WAN, the possibility that a plurality of communication paths exist is low. Therefore, since the payload size of fragmented IP datagrams is similarly likely to be fixed, a significant advantage of the present invention can be expected.

The present invention may be applied to a system constituted by a plurality of devices (for example, a host computer, an interface device, a reader, a printer, and the like) or to an apparatus consisting of a single device (for example, a copier, a facsimile apparatus, and the like).

In addition, it is needless to say that the object of the present invention can also be achieved by supplying a storage medium storing a program code of software that realizes the functions of the above-described embodiment to a system or an apparatus and having a computer (a CPU or an MPU) of the system or the apparatus read out and execute the program code stored in the storage medium.

In this case, the program code itself read from the computer-readable storage medium realizes the function of the embodiment described above and the storage medium storing the program code constitutes the present invention.

Examples of the storage medium for supplying the program code may include a flexible disk, a hard disk, an optical disk, a magnetic optical disk, a CD-ROM, a CD-R, a magnetic tape, a non-volatile memory card, a ROM, and the like.

Furthermore, in addition to a case where functions of the embodiment described above are realized by having a computer read and execute a program code, the present invention also includes cases where the functions of the embodiment described above are realized by an OS (operating system) or the like running on a computer and which performs a part or all of the actual processing based on instructions of the program code.

In addition, the present invention is also applicable to cases where a program code read out from a storage medium is written into a memory provided either on an expansion card inserted into a computer or in an expansion unit connected to the computer. In such a case, a CPU or the like provided on the expansion card or the expansion unit subsequently performs a part of or all of the actual processing based on instructions contained in the program code, thereby realizing the functions of the embodiment described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-183023, filed Jul. 14, 2008, which is hereby incorporated by reference herein in its entirety.

What is claimed is:

1. A protocol processing apparatus that reassembles a fragmented IP datagram, comprising:
    a determination unit that determines a unit size of a bitmap table to be used in the reassembly based on the size of the received fragmented IP datagram;
    a generation unit that generates a bitmap table according to the unit size determined by the determination unit; and
    a reassembly unit that reassembles the IP datagram using the bitmap table generated by the generation unit,
    wherein the generation unit does not generate a bitmap table when the unit size determined by the determination unit is an integer multiple of the unit size of an existing bitmap table, and generates a bitmap table whose unit size is a common divisor of the size of the IP datagram and the unit size of the existing bitmap table when the unit size determined by the determination unit is not an integer multiple of the unit size of the existing bitmap table.

2. The apparatus according to claim 1, wherein the size of the received fragmented IP datagram is calculated from a value indicating an offset from the top of the IP datagram and the length of the entire IP datagram which are included in the received fragmented IP datagram.

3. A processing method of a protocol processing apparatus that reassembles a fragmented IP datagram, the method comprising:
    determining a unit size of a bitmap table to be used in the reassembly based on the size of the received fragmented IP datagram;
    generating a bitmap table according to the determined unit size; and
    reassembling the IP datagram using the generated bitmap table,
    wherein the generating step does not generate a bitmap table when the unit size determined by the determining step is an integer multiple of the unit size of an existing bitmap table, and generates a bitmap table whose unit size is a common divisor of the size of the IP datagram and the unit size of the existing bitmap table when the unit size determined by the determining step is not an integer multiple of the unit size of the existing bitmap table.

4. A non-transitory storage medium, readable by a computer, on which is stored a computer program which causes a computer to execute the processing method of a protocol processing apparatus according to claim 3.

* * * * *